(12) United States Patent
Thomeer et al.

(10) Patent No.: US 9,324,049 B2
(45) Date of Patent: Apr. 26, 2016

(54) SYSTEM AND METHOD FOR TRACKING WELLSITE EQUIPMENT MAINTENANCE DATA

(75) Inventors: Hubertus V. Thomeer, Houston, TX (US); Ed Faught, Argyle, TX (US); Kay Stefan Capps, College Station, TX (US); Cole Tepe, Fort Worth, TX (US); Rock Rodriguez, Argyle, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 744 days.

(21) Appl. No.: 13/341,903

(22) Filed: Dec. 30, 2011

(65) Prior Publication Data

US 2012/0203507 A1 Aug. 9, 2012

Related U.S. Application Data

(60) Provisional application No. 61/428,376, filed on Dec. 30, 2010.

(51) Int. Cl.
| *G06F 15/00* | (2006.01) |
| *G06Q 10/06* | (2012.01) |
| *G06Q 30/06* | (2012.01) |
| *E21B 43/26* | (2006.01) |
| *E21B 43/267* | (2006.01) |
| *E21B 43/25* | (2006.01) |
| *E21B 43/16* | (2006.01) |

(52) U.S. Cl.
CPC .......... *G06Q 10/06316* (2013.01); *G06Q 30/06* (2013.01); *E21B 43/16* (2013.01); *E21B 43/25* (2013.01); *E21B 43/26* (2013.01); *E21B 43/267* (2013.01)

(58) Field of Classification Search
CPC . G06Q 10/20; G06Q 30/06; G06Q 10/06316; G07C 5/006; G07C 5/008; G05B 23/0283; E21B 43/267; E21B 43/26; E21B 43/25; E21B 43/16
USPC .................. 702/183, 188; 705/305; 701/31.4; 166/369, 105, 308.1, 68.5
See application file for complete search history.

(56) References Cited

U.S. PATENT DOCUMENTS

| 6,505,145 | B1 | 1/2003 | Bjornson | |
| 6,952,680 | B1 | 10/2005 | Melby et al. | |
| 6,985,750 | B1 * | 1/2006 | Vicknair et al. | ............. 455/519 |
| 7,308,331 | B2 | 12/2007 | Bjornson | |
| 7,584,165 | B2 | 9/2009 | Buchan | |
| 7,711,486 | B2 * | 5/2010 | Thigpen et al. | ................... 702/9 |
| 7,845,413 | B2 * | 12/2010 | Shampine et al. | ............ 166/369 |
| 2002/0052769 | A1 | 5/2002 | Navani et al. | |
| 2002/0156582 | A1 * | 10/2002 | Newman | ............................ 702/5 |
| 2003/0069648 | A1 | 4/2003 | Douglas et al. | |
| 2003/0088534 | A1 | 5/2003 | Kalantar et al. | |

(Continued)

*Primary Examiner* — Carol S Tsai
(74) *Attorney, Agent, or Firm* — Rachel E. Greene; Tim Curington (57) ABSTRACT

A maintenance system includes a plurality of wellsite equipment located at or nearby a wellsite, and a communication interface device for monitoring data that is representative of a health status of the equipment. The system further includes a database containing prior health status of the equipment, and a central data server in communication with the database which is capable of communicating with the communication interface device for generating analysis of the equipment. The analysis includes comparing the monitored data with the prior health status to prescribe if maintenance is required.

13 Claims, 6 Drawing Sheets

(56) References Cited

U.S. PATENT DOCUMENTS

| | | |
|---|---|---|
| 2003/0167238 A1 | 9/2003 | Zeif |
| 2003/0196798 A1* | 10/2003 | Newman .................. 166/250.01 |
| 2004/0073468 A1* | 4/2004 | Vyas et al. ........................ 705/8 |
| 2005/0131729 A1* | 6/2005 | Melby et al. ...................... 705/1 |
| 2005/0222813 A1* | 10/2005 | Bjornson ....................... 702/183 |
| 2006/0080063 A1 | 4/2006 | Vaughn |
| 2006/0097854 A1* | 5/2006 | Basu et al. ................. 340/425.5 |
| 2007/0174152 A1 | 7/2007 | Bjornberg et al. |
| 2007/0277982 A1* | 12/2007 | Shampine et al. ......... 166/308.1 |
| 2008/0162248 A1 | 7/2008 | Vachon et al. |
| 2008/0257544 A1* | 10/2008 | Thigpen et al. .......... 166/250.01 |
| 2008/0262736 A1* | 10/2008 | Thigpen et al. .................... 702/9 |
| 2009/0005927 A1* | 1/2009 | Schlatre et al. ................. 701/30 |
| 2010/0088141 A1 | 4/2010 | Hill |
| 2010/0250139 A1* | 9/2010 | Hobbs et al. ...................... 702/6 |
| 2011/0178611 A1 | 7/2011 | Daraiseh et al. |
| 2012/0026002 A1 | 2/2012 | Vu et al. |
| 2012/0050063 A1* | 3/2012 | Bahorich et al. ........... 340/853.1 |

\* cited by examiner

SYSTEM AND METHOD FOR TRACKING WELLSITE EQUIPMENT MAINTENANCE DATA

CROSS-REFERENCE TO RELATED APPLICATION

The current application is based on and claims the benefit of priority from U.S. Provisional Patent Application No. 61/428,376, filed on Dec. 30, 2010; the entire contents of which are hereby incorporated by reference.

BACKGROUND

The statements made herein merely provide information related to the present disclosure and may not constitute prior art, and may describe some embodiments illustrating the invention.

Embodiments disclosed herein generally relate to systems or methods for facilitating, capturing, tracking, synthesizing, analyzing, managing and/or utilizing wellsite maintenance data for wellsite equipment. Embodiments disclosed herein also relate to systems or methods for determining degradation conditions of wellsite equipment or predicting residual life of wellsite equipment before, during, and after an oilfield operation. Examples of such oilfield operations include, but are not limited to, hydraulic fracturing, acid stimulation, cementing, etc.

In some embodiments, the wellsite equipment being maintained includes positive displacement pumps, sometimes referred to as reciprocating pumps. Positive displacement pumps are generally used in oilfield operations to pump fluids into a wellbore and the surrounding reservoir.

A given reciprocating pump may comprise one or more pump chambers that each receive a reciprocating plunger. When multiple chambers are enclosed in a reciprocating pump, the reciprocating pump is also called a multiplex pump. In any event, in a typical reciprocating pump, as the plunger is moved in one direction by the rotating crankshaft, fluid is drawn into the pump chamber through a one-way suction valve. Upon reversal of the plunger motion, the suction valve is closed and the fluid is forced outwardly through a discharge valve. The continued reciprocation of the plunger continues the process of drawing fluid into the pump and discharging fluid from the pump. The discharged fluid can be routed through tubing to a desired location, such as into a wellbore.

Typically, multiplex pumps have two sections: (a) a power end, the motor assembly that drives the pump plungers (the driveline and transmission are parts of the power end); and (b) a fluid end, the pump container that holds and discharges pressurized fluid. In triplex pumps, the fluid end has three fluid cylinders. In quintuplex pumps, the fluid end has five fluid cylinders. A fluid end may comprise a single block having all cylinders bored therein, commonly referred to as a monoblock fluid end. Alternatively, each individual cylinder can be bored in a single block, and subsequently multiple blocks are connected together to form an assembled fluid end, commonly referred to as a split fluid end. Embodiments of the current disclosure can be applied to multiplex pumps with monoblock fluid ends, split fluid ends, or other variations thereof.

One particularly useful application of the multiplex pump is hydraulic fracturing, where a fluid is pumped down a wellbore at a flow rate and pressure sufficient to fracture a subterranean formation. After the fracture is created or, optionally, in conjunction with the creation of the fracture, proppants may be injected into the wellbore and into the fracture. The proppant is a particulate material added to the pumped fluid to produce a slurry, which is often very abrasive and/or corrosive. Pumping this slurry at the required flow rate and pressure is a severe pump duty. In fracturing operations each pump may be required to pump up to twenty barrels per minute at pressures up to 20,000 psi. The pumps for this application are quite large and are frequently moved to the oilfield on semi-trailer trucks or the like. Many times a single multiplex pump will occupy the entire truck trailer. These pumps are connected together at the well site to produce a pumping system which may include several multiplex pumps. A sufficient number of pumps are connected to a common line to produce the desired volume and pressure output. For example, some fracturing jobs have required up to 36 pumps.

Since fracturing operations are desirably conducted on a continuous basis, the disruption of a fracture treatment because of a failure of surface equipment is costly, time consuming, inefficient, and unproductive. Further, when such massive pumps are used, it is difficult in some instances to determine, in the event of a pump failure, which pump has failed. Because of the severe pump duty and the frequent failure rate of such pumps, it is normal to take thirty to one hundred percent excess pump capacity to each fracture site. The necessity for the excess pump capacity requires additional capital to acquire the additional multiplex pumps and considerable expense to maintain the additional pumps and to haul them to the site. Therefore, multiplex pumps and other surface equipment are frequently disassembled and inspected before and after each fracture treatment and, in some instances, routinely rebuilt before or after each fracture treatment in an attempt to avoid equipment failures during subsequent fracture treatments.

Traditionally, wellsite maintenance data of multiplex pumps or any other wellsite equipment is recorded manually on paper or in Excel spreadsheets by field engineers at the wellsite. The maintenance data is then communicated from the wellsite to a central data location via telephone or e-mail. Sometimes, the maintenance data is not communicated to the central data location at all or gets lost during transmission. If the wellsite data safely arrives at the central data location, it is traditionally entered into a variety of computer databases by clerks or administrators at the central data location. One prominent issue associated with the traditional method is that the data capturing and transmitting process is not automated and any breakdown in the process may cause delay or failure to the equipment. Another problem with the conventional method is that it is not uniformly executed across operations; therefore, the data received at the center may be incorrect or missing critical information. When the maintenance data is incomplete or inaccurate, it is difficult for the management to determine what maintenance is needed, when maintenance is needed, and which equipment (or a component of equipment) requires maintenance, where the equipment is currently located, which location(s) the equipment has been deployed in its life, etc.

In these respects, the current disclosure aims to provide a method and system to capture maintenance data at the wellsite that addresses the above-mentioned problems, and more specifically the current disclosure relates to methods and systems to facilitate, capture, track, and use wellsite maintenance data so that appropriate maintenance can be prescribed timely, accurately, and effectively, and equipment failure during field operations can be minimized or eliminated. The following detailed description is provided in the context of fracturing operations using triplex pumps. However, it should be noted that embodiments of the current disclosure can be applied to any other oilfield operation or wellsite equipment operation.

SUMMARY OF THE DISCLOSURE

According to an aspect of the present disclosure, one or more embodiments relate to a maintenance system preferably comprising a plurality of wellsite equipment located at or nearby a wellsite, a communication interface device for monitoring data that is representative of a health status of the equipment, and a database comprising prior health status of the equipment. The system further comprises a central data server in communication with the database and capable of communicating with the communication interface device for generating analysis of the equipment. Such analysis includes at least, comparing the monitored data with the prior health status to prescribe if maintenance is required.

According to another aspect of the present disclosure, one or more embodiments relate to a maintenance system for planning maintenance and operation of wellsite equipment units. The maintenance system preferably comprises a fleet of monitored wellsite equipment units distributed over a geographical area, a communication interface device located at or nearby a wellsite where at least one of the fleet of monitored wellsite equipment units are located, and a communication network for sending and receiving the data between the communication interface device and a central data server. The communication interface device preferably comprises hardware and software for monitoring data that is representative of a health status of the equipment. The central data server is preferably capable of identifying if the monitored wellsite equipment units are in operation, not in operation or being maintained in order to plan maintenance and operation of the fleet of monitored wellsite equipment units.

In one embodiment, the system of the current disclosure comprises a computer located at or nearby a wellsite, a computer network (wired, wireless, satellite, Bgan, etc.), and a central data server that is located away from the wellsite and connected to the computer via the computer network. The equipment operator, field supervisor and other field personnel may enter into the computer wellsite equipment maintenance data such as job observations and maintenance performed during the job, etc. Such maintenance data can be subsequently transmitted to the central data server via the computer network for storage and retrieval. The central data server contains both the current and historic data of the wellsite equipment, is connected to computers deployed at various wellsites, and keeps maintenance data in wellsite computers in synchronization with maintenance data in the central data server.

Optionally, the system further includes a handheld input device that can be carried by a field operator while working at the wellsite. The field operator can input data into the handheld device at a location nearby a piece of oilfield equipment that is under inspection or maintenance. The field operator can then bring the handheld device to a location nearby the computer to transmit the data recorded in the handheld device to the wellsite computer. The handheld device may also be equipped with network connecting capability so that it can be directly connected to the computer and/or the central data server via the computer network.

In one embodiment, the wellsite computer is a touch screen computer with a graphic interface; therefore the field operator can input data, issue command, print work order, etc. without the need of a keyboard, a mouse, or other external data entry devices.

In one embodiment, a data acquisition program is provided in the computer and/or the handheld input device so that wellsite equipment maintenance data can be entered into the computer and/or the handheld input device. In one embodiment, a wellsite modeling program is provided in the computer and/or the handheld input device so that a computer model can be generated at the wellsite based on the data available at the time to reflect the healthy condition of the wellsite equipment and the estimated maintenance schedule for the wellsite equipment.

In one embodiment, the system and method of the current disclosure comprises a remote control electronic device that is configured to operate wellsite equipment. This allows pumps to be controlled from a single place remote from the equipment, the activities of which will be ultimately entered into touch screen computer and/or the handheld input device.

In one embodiment, the computer and/or the handheld device is provided at a maintenance shop that is located away from the wellsite. Data captured at the maintenance shop is transmitted to the central data server and combined with data captured at the wellsite. The data contained in the central data server can be accessed and downloaded for use by various stakeholders, including but not limited to the maintenance shop, equipment vendors, engineering design centers, logistics, procurement, the district that manages the operation, and the field.

The current disclosure has several advantages. The network connection ensures that equipment maintenance data is captured timely, consistently, and continuously. Accordingly, the field management can monitor the equipment regularly, measure deterioration at any moment, and intervene as early as possible when there is a risk of equipment breakdown. The central data server will combine the knowledge of the equipment from all sources, including jobs performed by the equipment, maintenance performed on the equipment, materials and supplies used in the equipment, major component breakdown, equipment appearance and other observations, current location of the equipment, historic locations of the equipment, engineers who worked on the equipment, etc. Equipment data is constantly in synchronization with the maintenance data; job data is constantly in synchronization with the maintenance data. Equipment conditions and equipment location can be actively monitored and maintenance schedules can be appropriately devised.

BRIEF DESCRIPTION OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

FIGS. 4.1-4.7 are schematic illustrations depicting example screenshots of a communication interface in accordance with an embodiment disclosed herein.

DETAILED DESCRIPTION

Specific embodiments of the present disclosure will now be described in detail with reference to the accompanying drawings. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. Further, in the following detailed description of embodiments of the present disclosure, numerous specific details are set forth in order to provide a more thorough understanding of the invention. However, it will be apparent to one of ordinary skill in the art that the embodiments disclosed herein may be practiced without these specific details. In other instances, well-known features have not been described in detail to avoid unnecessarily complicating the description.

It should also be noted that in the development of any such actual embodiment, numerous decisions specific to circumstance must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Furthermore, the description and examples are presented solely for the purpose of illustrating the different embodiments, and should not be construed as a limitation to the scope and applicability. While any composition or structure may be described herein as comprising certain materials, it should be understood that the composition could optionally comprise two or more different materials. In addition, the composition or structure can also comprise some components other than the ones already cited. Although some of the following discussion emphasizes fracturing, the compositions and methods may be used in any well treatment in which diversion is needed. Examples include fracturing, acidizing, water control, chemical treatments, and wellbore fluid isolation and containment. Embodiments will be described for hydrocarbon production wells, but it is to be understood that they may be used for wells for production of other fluids, such as water or carbon dioxide, or, for example, for injection or storage wells. It should also be understood that throughout this specification, when a range is described as being useful, or suitable, or the like, it is intended that any and every value within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

Figure 1:
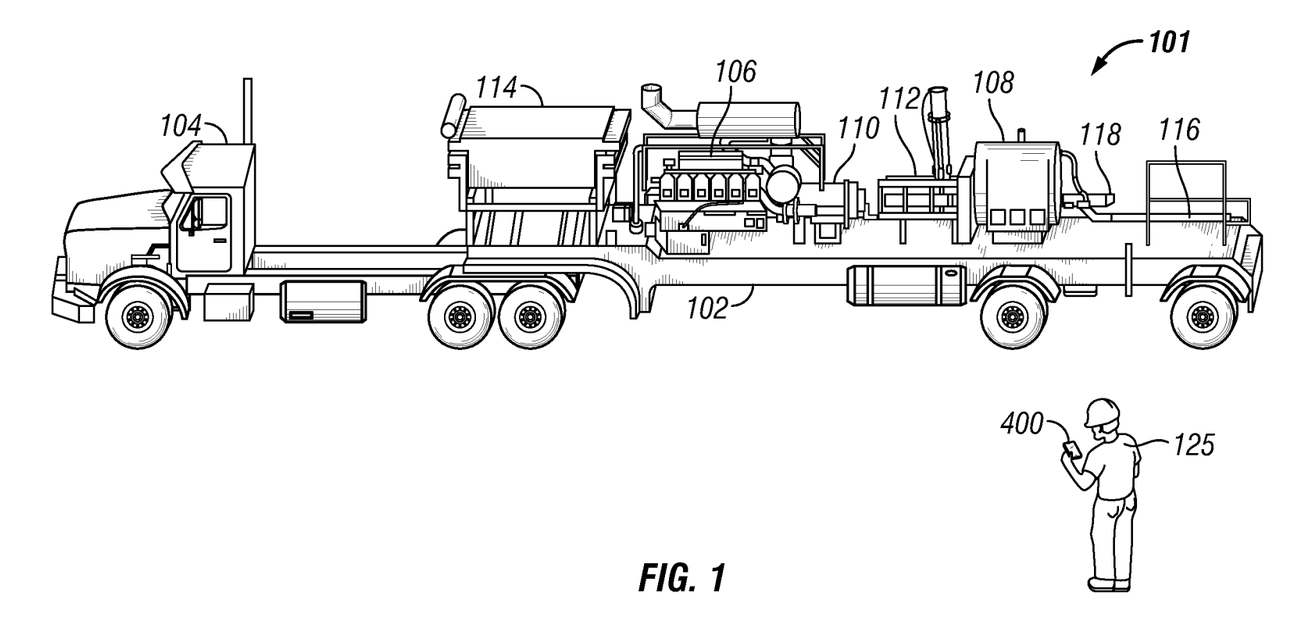
FIG. 1 is a schematic representation depicting wellsite equipment for performing an oilfield operation on a well in accordance with an exemplary embodiment disclosed herein.

Referring to the drawings, illustrations and pictures, and in particular FIG. 1, one example of a monitored piece of wellsite equipment is illustrated therein. A plunger pump 101 is depicted for pumping a fluid from a well surface to a wellbore. As shown, the plunger pump 101 is mounted on a standard trailer 102 for ease of transportation by a tractor 104. The plunger pump 101 includes a prime mover 106 that drives a crankshaft through a transmission 110 and a drive shaft 112. The crankshaft, in turn, drives one or more plungers toward and away from a chamber in the pump fluid end 108 in order to create pressure oscillations of high and low pressures in the chamber. These pressure oscillations allow the pump to receive a fluid at a low pressure and discharge it at a high pressure via one way valves (also called check valves). Also connected to the prime mover 106 is a radiator 114 for cooling the prime mover 106. In addition, the plunger pump fluid end 108 includes an intake pipe 116 for receiving fluid at a low pressure and a discharge pipe 118 for discharging fluid at a high pressure.

A field operator, equipment operator or field engineer 125 is depicted therein for recording maintenance data, and/or performing maintenance operations. For example, the field operator 125 may check the oil, change the transmission fluid, change the seals and check for leakage, among many other maintenance related operations known in the art. As will be explained in more detail below, the engineer 125 may acquire and/or record data relating to maintenance using a handheld data acquisition device, computer, touch screen computer or communication interface device 400. The field operator 125 can input data into the handheld device 400 at a location nearby the wellsite equipment 101 under inspection or maintenance. The field operator 125 can then transmit the acquired data to a central data server using either a nearby computer, or a communication network if the communication interface device 400 is equipped with network connecting capability.

Figure 2:
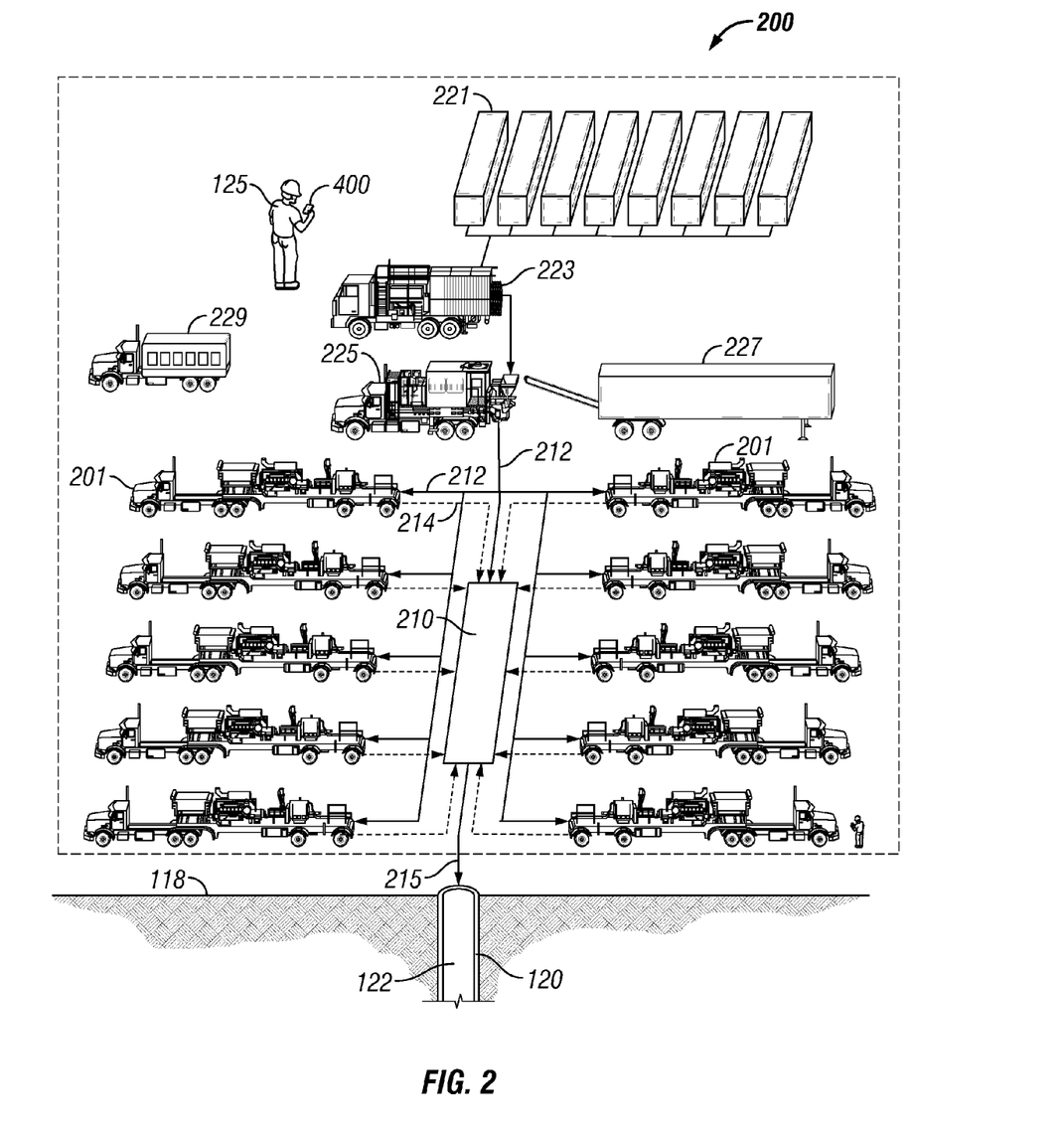
FIG. 2 is a schematic representation depicting an oilfield operation in accordance with an exemplary embodiment disclosed herein.

Referring now to FIG. 2, one example of an oilfield operation is shown with a field operator 125 depicted therein for recording maintenance and operational data on a communication interface device 400, and/or performing maintenance in accordance with a prescribed maintenance plan. A pumping system 200 is shown for pumping a fluid from a surface 118 of a well 120 to a wellbore 122 during an oilfield operation. In this particular example, the operation is a hydraulic fracturing operation, and hence the fluid pumped is a fracturing fluid. As shown, the pump system 200 includes a plurality of water tanks 221, which feed water to a gel maker 223. The gel maker 223 combines water from the tanks 221 with a gelling agent to form a gel. The gel is then sent to a blender 225 where it is mixed with a proppant from a proppant feeder 227 to form a fracturing fluid. The gelling agent increases the viscosity of the fracturing fluid and allows the proppant to be suspended in the fracturing fluid. It may also act as a friction reducing agent to allow higher pump rates with less frictional pressure.

The fracturing fluid is then pumped at low pressure (for example, around 60 to 120 psi) from the blender 225 to a plurality of plunger pumps 201 as shown by solid lines 212. Note that each plunger pump 201 in the embodiment of FIG. 2 may have the same or a similar configuration as the plunger pump 101 shown in FIG. 1. As shown in FIG. 2, each plunger pump 201 receives the fracturing fluid at a low pressure and discharges it to a common manifold 210 (sometimes called a missile trailer or missile) at a high pressure as shown by dashed lines 214. The missile 210 then directs the fracturing fluid from the plunger pumps 201 to the wellbore 122 as shown by solid line 215.

In a typical hydraulic fracturing operation, an estimate of the well pressure and the flow rate required to create the desired side fractures in the wellbore is calculated. Based on this calculation, the amount of hydraulic horsepower needed from the pumping system in order to carry out the fracturing operation is determined. For example, if it is estimated that the well pressure and the required flow rate are 6000 psi (pounds per square inch) and 68 BPM (Barrels Per Minute), then the pump system 200 would need to supply 10,000 hydraulic horsepower to the fracturing fluid (i.e., 6000*68/40.8).

In one embodiment, the prime mover 106 in each plunger pump 201 is an engine with a maximum rating of 2250 brake horsepower, which, when accounting for losses (typically about 3% for plunger pumps in hydraulic fracturing operations), allows each plunger pump 201 to supply a maximum of about 2182 hydraulic horsepower to the fracturing fluid. Therefore, in order to supply 10,000 hydraulic horsepower to a fracturing fluid, the pump system 200 of FIG. 2 would require at least five plunger pumps 201.

However, in order to prevent an overload of the transmission 110, between the engine 106 and the fluid end 108 of each plunger pump 201, each plunger pump 201 is normally operated well under its maximum operating capacity. Operating the pumps under their operating capacity also allows for one pump to fail and the remaining pumps to be run at a higher speed in order to make up for the absence of the failed pump.

As such in the example of a fracturing operation requiring 10,000 hydraulic horsepower, bringing ten plunger pumps 201 to the wellsite enables each pump engine 106 to be operated at about 1030 brake horsepower (about half of its maximum) in order to supply 1000 hydraulic horsepower individually and 10,000 hydraulic horsepower collectively to the fracturing fluid. On the other hand, if only nine pumps 201 are brought to the wellsite, or if one of the pumps fails, then each of the nine pump engines 106 would be operated at about 1145 brake horsepower in order to supply the required 10,000 hydraulic horsepower to the fracturing fluid. As shown, a computerized control system 229 may be employed to direct the entire pump system 200 for the duration of the fracturing operation.

In performing the example operation as described above at the required pressure, flow rate, and hydraulic horsepower, numerous opportunities for equipment failure are present. Accordingly, in one aspect, the current disclosure provides a system and method to facilitate/capture and use wellsite maintenance data that allows an understanding of the state of equipment, location of equipment and equipment maintenance cost. In another aspect, the current disclosure provides a system and method to facilitate/capture and use wellsite maintenance data that is user interactive to provide a common language that is easily understood and uses existing well site infrastructure to locate where equipment is located. Other location identifiers such as GPS, barcode, RFID-Tag, etc. are not required, but optional. In a further aspect, the current disclosure provides a system and method to facilitate/capture and use wellsite maintenance data that provides a seamless method to provide each asset with prior health status (e.g., maintenance history, usage, operational history, manufacturer information, location data, and the like) which follows the asset when it moves from location to location, therefore reducing the need for unnecessary maintenance due to lack of such health status. In yet another aspect, the current disclosure provides a system and method to facilitate/capture and use wellsite maintenance data that enables remote monitoring of wellsite maintenance, remote inputting of wellsite maintenance, and automated recording of maintenance data.

The operation of the current disclosure is further illustrated in the context of a health monitoring maintenance tool 300 for monitoring and maintaining the fluid end of a multiplex pump, such as a triplex pump, in a fracturing operation. However, it should be noted that any other oilfield operations and equipment can be used in the current disclosure as well.

Figure 3:
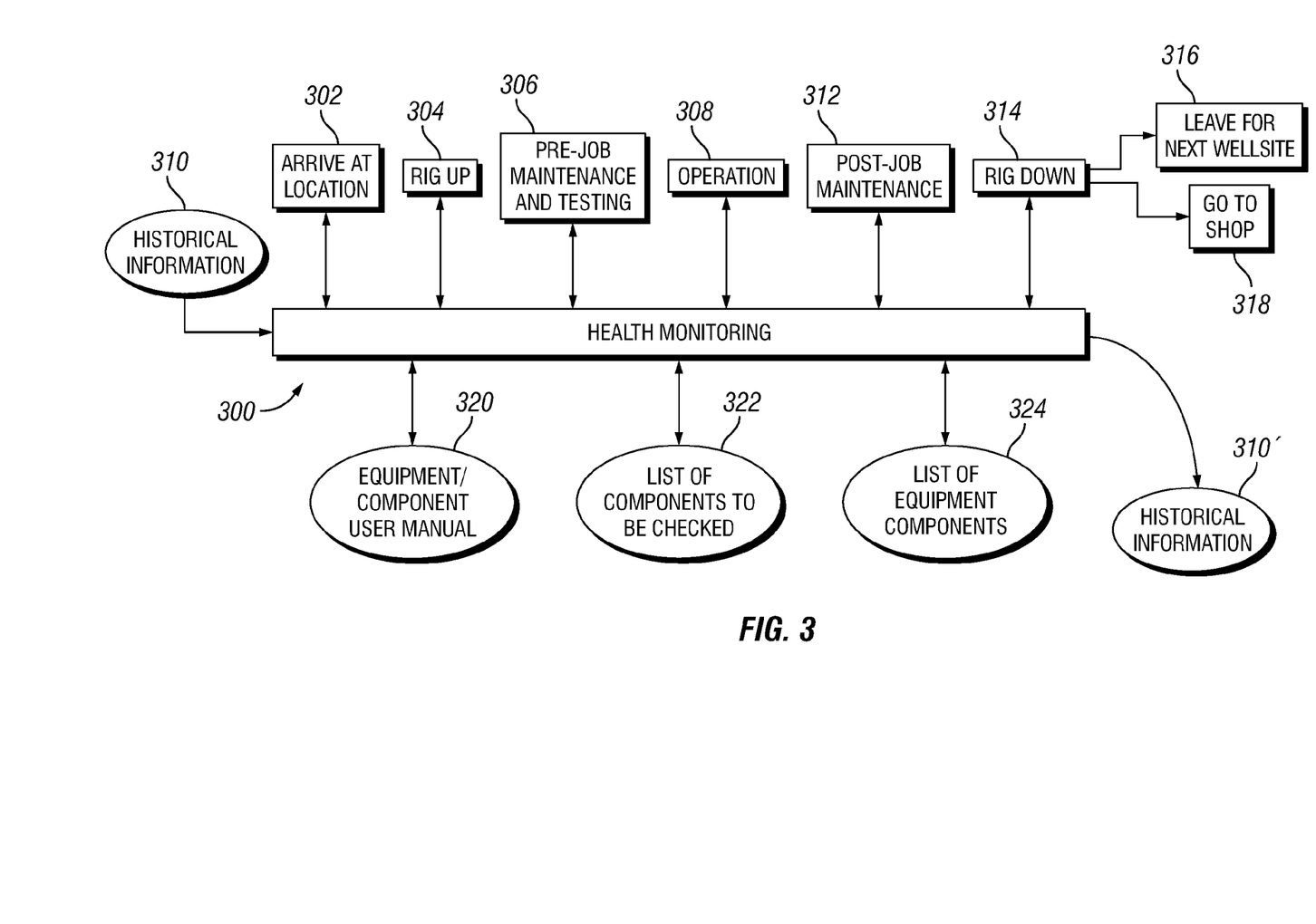
FIG. 3 is a schematic flow diagram illustrating health monitoring of an oilfield operation in accordance with an embodiment disclosed herein.

Referring now to FIG. 3, an example work flow illustrating health monitoring 300 of an oilfield operation, or fracturing job, is shown. Allowing for some variation: in operation, the equipment 101 first arrives at a wellsite location 302 and is rigged up 304. Upon arrival 302, the equipment 101 may be registered by the field operator 125 with the communication interface device 400, or the location of the equipment 101 may be known by the field operator 125 due to other location identifiers, such as GPS or the like. As the location of equipment 101 is known or registered, the operator sees a depiction of the equipment 101 via the communication interface and may access the equipment's prior health status 310 along with other relevant wellsite-related data (e.g. current job description, modeling data, and the like). The prior health status 310 and other relevant wellsite data may be located and stored on an off-site database, central data server or the computerized control system 229, which is preferably accessible by the communication interface device 400 via a wireless communication network connection. Therefore, prior to performing a required well operation 308, the equipment operator 125 is provided with the necessary historical information 310 in order to see what maintenance and/or testing may need to be performed pre-job 306, during the job 308, or post-job 312. For example, most fracturing jobs pump one or more stages in an operation 308, thus post-job maintenance 312 may be required after each stage or after a certain number of pump hours have been reached.

The field operator 125 is enabled to monitor the equipment 101 throughout the job, and record both observations and maintenance. Upon completion of the job 308 and any required post-job maintenance 312, the equipment 101 is rigged down (i.e., disassembled) 314 and either sent to another wellsite location 316 or sent to the shop 318 for more maintenance and repair. The health status of the equipment is updated 310' upon each recorded maintenance operation, and the health monitoring 300 may continue as the equipment 101 moves from one location to the next.

Using the monitored maintenance data, a field supervisor or market manager may better manage a fleet of equipment units 101 by knowing what units 101 are in operation, not in operation or being maintained. As such, the market manager is better able to plan maintenance and operation of the fleet of monitored wellsite equipment units.

In one embodiment, where connection to the communication network is problematic, the communication interface device 400 may be equipped with a storage medium for saving the recorded observations and maintenance on the device 400 until it can be uploaded to the central data server when connection is re-established.

In one aspect, the communication interface device 400 may generate work orders that can be sent to, or otherwise accessible by, the next equipment operator 125 or maintenance repair person. The maintenance performed and recorded in the communication interface device 400 is preferably synced through the network access to the central data server. The maintenance shop, district management, logistics and procurement can use the data to manage the equipment maintenance, location and operations. As equipment moves to another wellsite 316, a communication interface device 400 located at the new wellsite identifies the equipment's updated health status 310' and can monitor the equipment and preferably send data to the server.

In prescribing maintenance, the health monitoring maintenance tool 300 performs such analysis based on factors, such as: what prior operations were performed with the particular equipment; how was the equipment used in prior operations; what are the job parameters of the current operation to be performed; what are the other equipment units on site to be connected to the equipment for performing the required oilfield operation; how many total hours has the equipment been used; mean time between failure of the equipment; what reliability checks are required at the current hours of operation; what previous maintenance operations were performed; what current state is the equipment in; or the like. Therefore, the field operator 125 receives a prescribed list, or checklist, of maintenance components to be checked, or operations to be performed 322 that is unique to the required job and unique to the specific equipment 101. Such prescribed maintenance using the health monitoring maintenance tool 300 saves significant time, and is more efficient, than the prior art method of standard checklists of maintenance operations to be performed for every job regardless of any extenuating factors, such as those listed above as an example. Thus, the disclosed health monitoring maintenance tool 300 enables the field operator to deliver better service quality at a lower cost of ownership.

In monitoring the equipment 101, the health monitoring maintenance tool 300 may communicate with sensors located on the equipment, for example via the control system 229, and monitor trends of operation, for example: rate vs. pressure, temperature over time, pressure and temperature over time, torque converter temperature over time, and the like. Such data is filtered into the analysis of the health monitoring maintenance tool 300 and used to prescribe potential maintenance or sound certain alarms when a monitored trend is outside of predetermined boundaries.

The communication interface device 400 of the health monitoring maintenance tool 300 preferably provides an interactive user experience. For example, the communication interface may be touch screen operable, allowing the field operator 125 to easily input maintenance-related data, and visually see depictions of the equipment on which maintenance is to be performed.

Referring now to FIGS. 4.1-4.7, example screenshots of the communication interface device 400 are shown. In FIG. 4.1 particularly, the communication interface device 400 may be used to acquire the equipment identification 401 (e.g., serial number, asset number) of the equipment 101. The equipment identification 401 may be captured using RFID tags implanted or printed on the equipment 101, or likewise may be captured using the serial number already printed on the equipment 101. For example, the communication interface device 400 may comprise hardware and software for recognizing the serial number and verifying the recognition with the central data server. In operation, the equipment operator 125 may use a camera on the communication interface device 400 to take a picture or scan the equipment identification 401 via OCR (optical character recognition). The picture, or data related to the serial number, may then be sent to the central data server where said data may be crosschecked with related data on a database. Once the equipment is recognized via the equipment identification 401, the health monitoring maintenance tool 300 sends the operator 125, via a communication network, the prescribed list of maintenance operations that are required, if any. As explained herein, the operator 125 may also access prior health status 310 of the equipment, as well as the equipment/component user manual 320 and list of equipment components 324.

Figure 41:
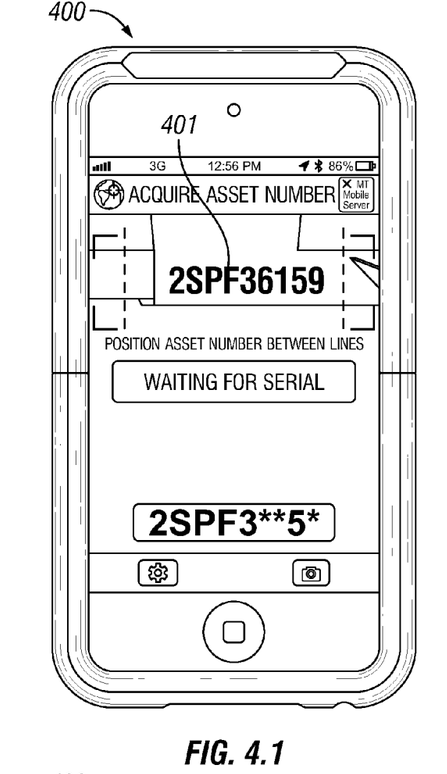
Figure 42:
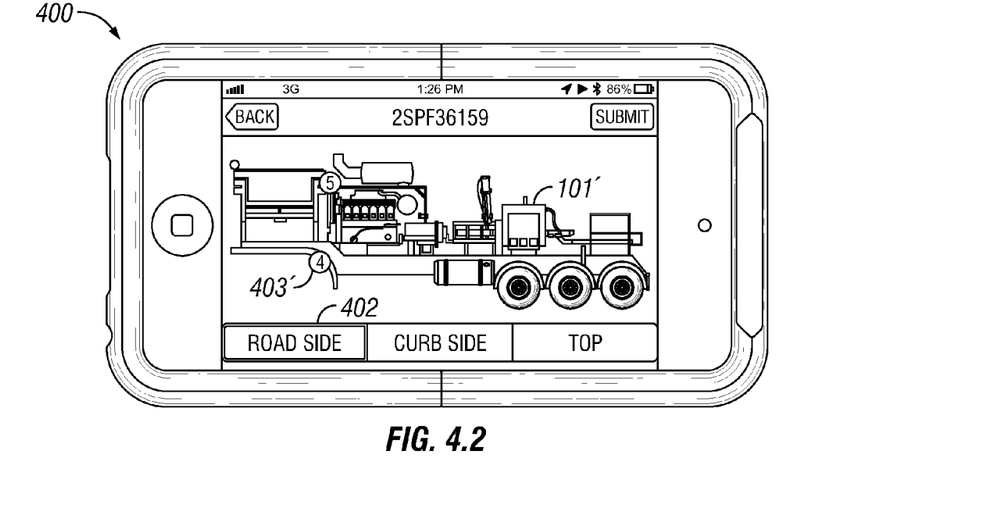
Figure 43:
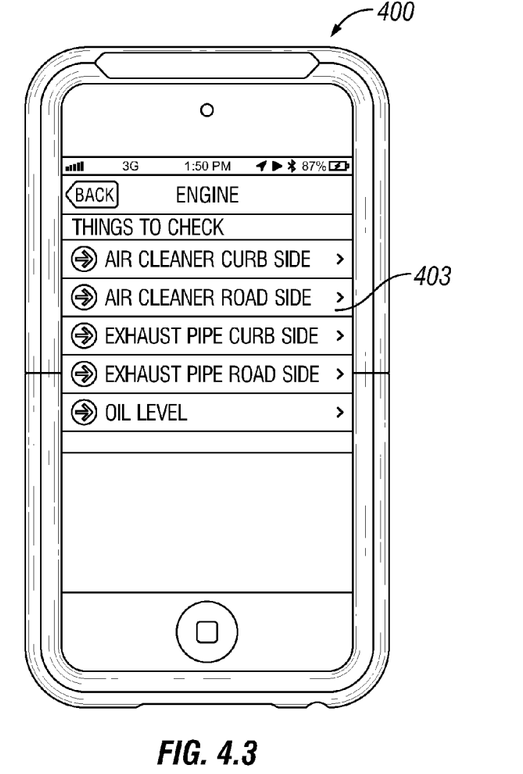
Figure 44:
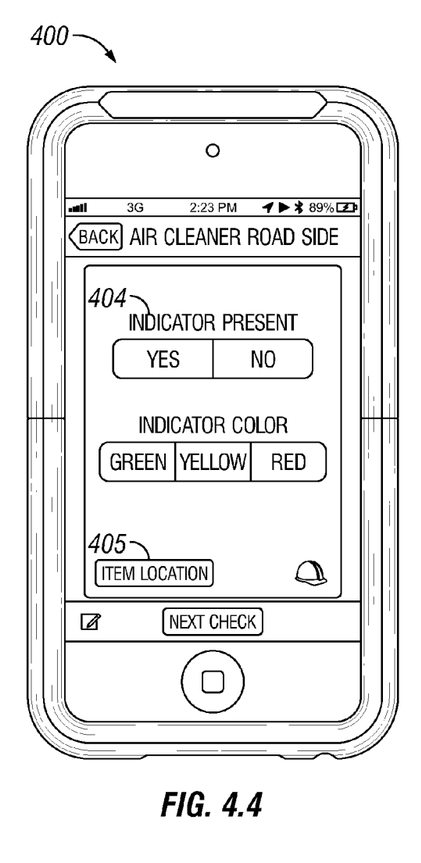
Figure 45:
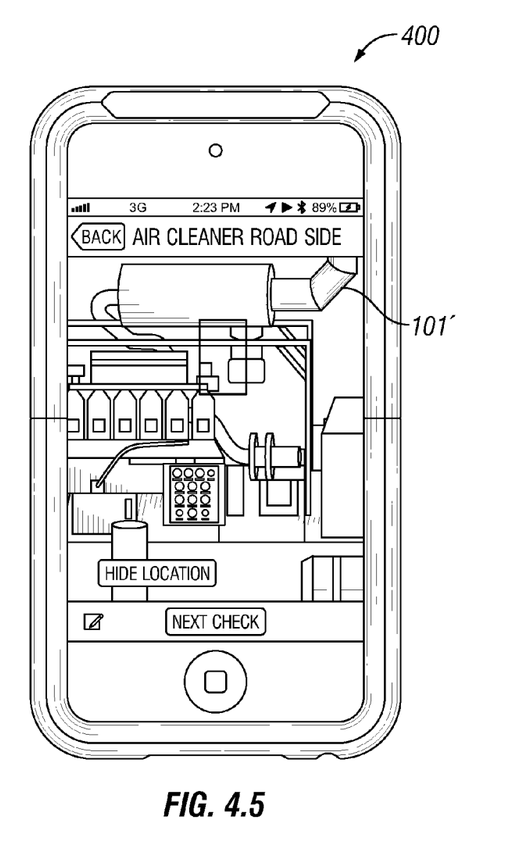
Figure 46:
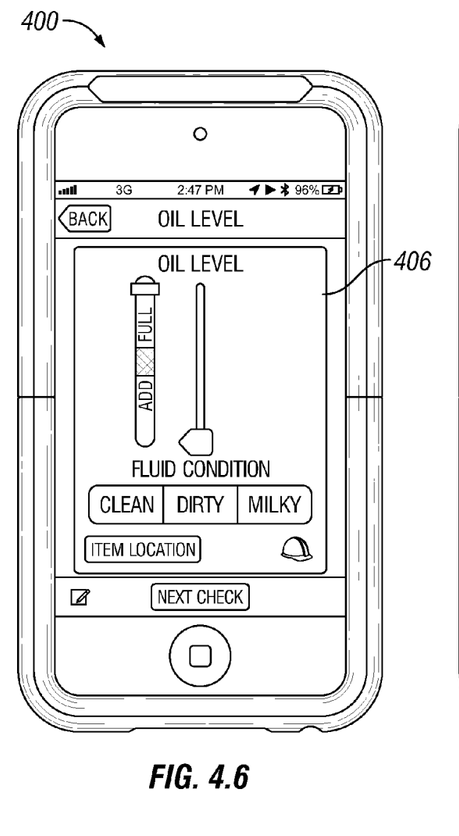
Figure 47:
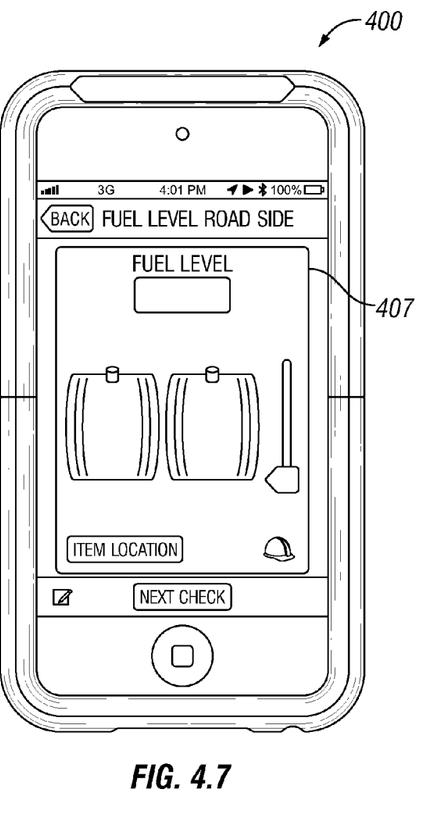

In FIGS. 4.2 and 4.3, an example of a prescribed list 403 of maintenance operations is shown for the equipment 101 identified in FIG. 4.1. As shown, the list 403 may be graphically illustrated as shown in FIG. 4.2 and/or may be textually presented as shown in FIG. 4.3.

Referring now to FIGS. 4.4 and 4.5, an example detailed action from the prescribed list 403 is shown. Provided the action item 404, the operator 125 may request that the particular item location 405 to be shown. As shown in FIG. 4.5, an illustration/depiction of the equipment 101' may be presented to help the operator 125 identify what needs to be checked or repaired. Referring to FIGS. 4.6 and 4.7, other examples of detailed actions from the prescribed list 403 are shown. In FIG. 4.6, the operator 125 may input the oil level 406 of a particular equipment unit. In FIG. 4.7, the operator 125 may input the fuel level 407 of a particular equipment unit.

Although the present disclosure has been described with reference to exemplary embodiments and implementations thereof, the present disclosure is not to be limited by or to such exemplary embodiments and/or implementations. Rather, the systems and methods of the present disclosure are susceptible to various modifications, variations and/or enhancements without departing from the spirit or scope of the present disclosure. Accordingly, the present disclosure expressly encompasses all such modifications, variations and enhancements within its scope.

What is claimed is:

1. A maintenance system, comprising:
    wellsite equipment comprising a plurality of plunger pumps connected with common manifold fluid to deliver fracturing fluid to a wellbore at pressure sufficient to fracture the wellbore;
    a handheld communication interface device for monitoring data that is representative of a health status of the equipment, wherein the handheld communication interface device provides an interactive user experience and is touch screen operable without the need of a keyboard or a mouse;
    a database comprising prior health status of the equipment; and
    a central data server in communication with the database and capable of communicating with the handheld communication interface device for generating analysis of the equipment, wherein said analysis includes comparing the monitored data with the prior health status to prescribe if maintenance is required;
    whereby unnecessary maintenance of the equipment is eliminated.

2. The maintenance system of claim 1, further comprising a communication network for sending and receiving the data between the handheld communication interface device and a central data server.

3. The maintenance system of claim 1, wherein the handheld communication interface device communicates with a wellsite computer.

4. The maintenance system of claim 1, wherein the handheld communication interface device stores the monitored data prior to transmitting said monitored data.

5. The maintenance system of claim 1, wherein health status comprises at least one of current operation of equipment; past operation of equipment; and prior maintenance operations performed.

6. The maintenance system of claim 5, wherein analysis comprises trending the health status over time.

7. The maintenance system of claim 1, wherein the database is remote from the wellsite.

8. The maintenance system of claim 1, wherein a user manual for performing maintenance on a component of the equipment is electronically accessible to a data acquisition device, a computer, a touch screen computer or the handheld communication interface device.

9. A maintenance system for planning maintenance and operation of wellsite equipment units, comprising:
   a fleet of monitored wellsite equipment units distributed over a geographical area, the units comprising plunger pumps and common manifolds;
   a handheld communication interface device comprising hardware and software for monitoring data that is representative of a health status of the fleet of monitored wellsite equipment units, wherein the handheld communication interface device provides an interactive user experience and is touch screen operable without the need of a keyboard or a mouse;
   a handheld communication network for sending and receiving the data between the communication interface device and a central data server; and
   wherein the central data server is capable of identifying if the monitored wellsite equipment units are in operation, not in operation or being maintained in order to plan maintenance, eliminate unnecessary maintenance and plan operation of the fleet of monitored wellsite equipment units.

10. The maintenance system of claim 9, further comprising a fleet of maintenance facilities distributed over a geographical area.

11. A method for tracking wellsite equipment maintenance data, comprising:
   rigging up a plurality of wellsite equipment units;
   scanning a unique machine-readable tag of at least one of the wellsite equipment units;
   collecting data into a handheld communication interface device, wherein the data is representative of a health status of the scanned wellsite equipment unit, and wherein the handheld communication interface device provides an interactive user experience and is touch screen operable without the need of a keyboard or a mouse;
   transmitting the data to a central data server for generating analysis of the wellsite equipment units, wherein said analysis includes comparing the monitored data with the prior health status to eliminate unnecessary maintenance.

12. The method of claim 11, further comprising generating a work order based on the prescribed list of maintenance.

13. The method of claim 11, further comprising performing maintenance according to the prescribed list of maintenance.

* * * * *